(12) United States Patent
Saha et al.

(10) Patent No.: US 11,792,679 B2
(45) Date of Patent: Oct. 17, 2023

(54) WIRELESS DATA SERVICE USING DYNAMIC DATA RATES BASED ON SERVING RADIO BANDS AND HISTORICAL DATA RATES

(71) Applicant: T-MOBILE INNOVATIONS LLC, Overland Park, KS (US)

(72) Inventors: Sougata Saha, Olathe, KS (US); Anurag Thantharate, Kansas City, MO (US); Sreekar Marupaduga, Overland Park, KS (US); Nicholas John Baustert, Jr., Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/868,343

(22) Filed: Jul. 19, 2022

(65) Prior Publication Data
US 2022/0353730 A1    Nov. 3, 2022

Related U.S. Application Data (63) Continuation of application No. 17/085,253, filed on Oct. 30, 2020, now Pat. No. 11,445,402.

(51) Int. Cl.
*H04W 28/02* (2009.01)
*H04W 24/10* (2009.01)
*H04W 72/0453* (2023.01)

(52) U.S. Cl.
CPC ....... *H04W 28/0268* (2013.01); *H04W 24/10* (2013.01); *H04W 72/0453* (2013.01)

(58) Field of Classification Search
CPC ............. H04W 28/0268; H04W 24/10; H04W 72/0453

USPC ......................................................... 455/450
See application file for complete search history.

(56) References Cited

U.S. PATENT DOCUMENTS

| | | | |
|---|---|---|---|
| 10,028,129 B2 | 7/2018 | Ly et al. | |
| 10,554,244 B2 | 2/2020 | Bai | |
| 10,554,468 B2 | 2/2020 | Zhou et al. | |
| 2018/0262924 A1* | 9/2018 | Dao | H04W 24/08 |
| 2018/0288654 A1 | 10/2018 | Shih et al. | |
| 2018/0294917 A1 | 10/2018 | Loncke et al. | |
| 2019/0069205 A1 | 2/2019 | Lee et al. | |
| 2019/0246321 A1* | 8/2019 | Li | H04L 5/005 |
| 2019/0268930 A1 | 8/2019 | Rudolf et al. | |
| 2019/0320322 A1 | 10/2019 | Jayawardene et al. | |
| 2021/0058146 A1* | 2/2021 | Eichen | H04B 7/18513 |

FOREIGN PATENT DOCUMENTS

JP    2004282169 A    10/2004

* cited by examiner

*Primary Examiner* — Ted M Wang (57) ABSTRACT

A wireless communication network serves a wireless User Equipment (UE) over a backhaul link. A wireless network core identifies a wireless access node and a radio band for the wireless UE. The wireless network core selects a backhaul data rate for the wireless UE based on the radio band for the wireless UE. The wireless network core exchanges user data with the wireless access node over the backhaul link using the selected backhaul data rate. The wireless access node exchanges the user data with the wireless network core over the backhaul link using the selected backhaul data rate. The wireless access node wirelessly exchanges the user data with the wireless UE over the radio band.

20 Claims, 9 Drawing Sheets

WIRELESS DATA SERVICE USING DYNAMIC DATA RATES BASED ON SERVING RADIO BANDS AND HISTORICAL DATA RATES

RELATED CASES

This United States Patent Application is a continuation of U.S. patent application Ser. No. 17/085,253 that was filed on Oct. 30, 2020 and is entitled "WIRELESS DATA SERVICE USING DYNAMIC DATA RATES BASED ON SERVING RADIO BANDS AND HISTORICAL DATA RATES." U.S. patent application Ser. No. 17/085,253 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Millimeter Wave (MMW), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

The wireless network cores control the data rates for the wireless user devices over the backhaul data links. For example, a wireless network core may select a downlink Ambient Bit Rate (AMBR) for a wireless user device over a backhaul data link. The AMBR comprises a maximum data rate for all non-Guaranteed Bit Rate (non-GBR) connections for one or more Packet Data Networks (PDNs). The actual data rates experienced by the wireless user devices over the backhaul data links vary from these maximum levels in the AMBRs based on network conditions, user activity, and the like. Unfortunately, the wireless network cores over allocate resources to serve the wireless user devices at the AMBRs. The wireless network cores do not efficiently and effectively use the actual data rates to control backhaul data rates for the wireless user devices.

Technical Overview

A wireless communication network serves a wireless User Equipment (UE) over a backhaul link. A wireless network core identifies a wireless access node and a radio band for the wireless UE. The wireless network core selects a backhaul data rate for the wireless UE based on the radio band for the wireless UE. The wireless network core exchanges user data with the wireless access node over the backhaul link using the selected backhaul data rate. The wireless access node exchanges the user data with the wireless network core over the backhaul link using the selected backhaul data rate. The wireless access node wirelessly exchanges the user data with the wireless UE over the radio band.

DETAILED DESCRIPTION

Figure 1:
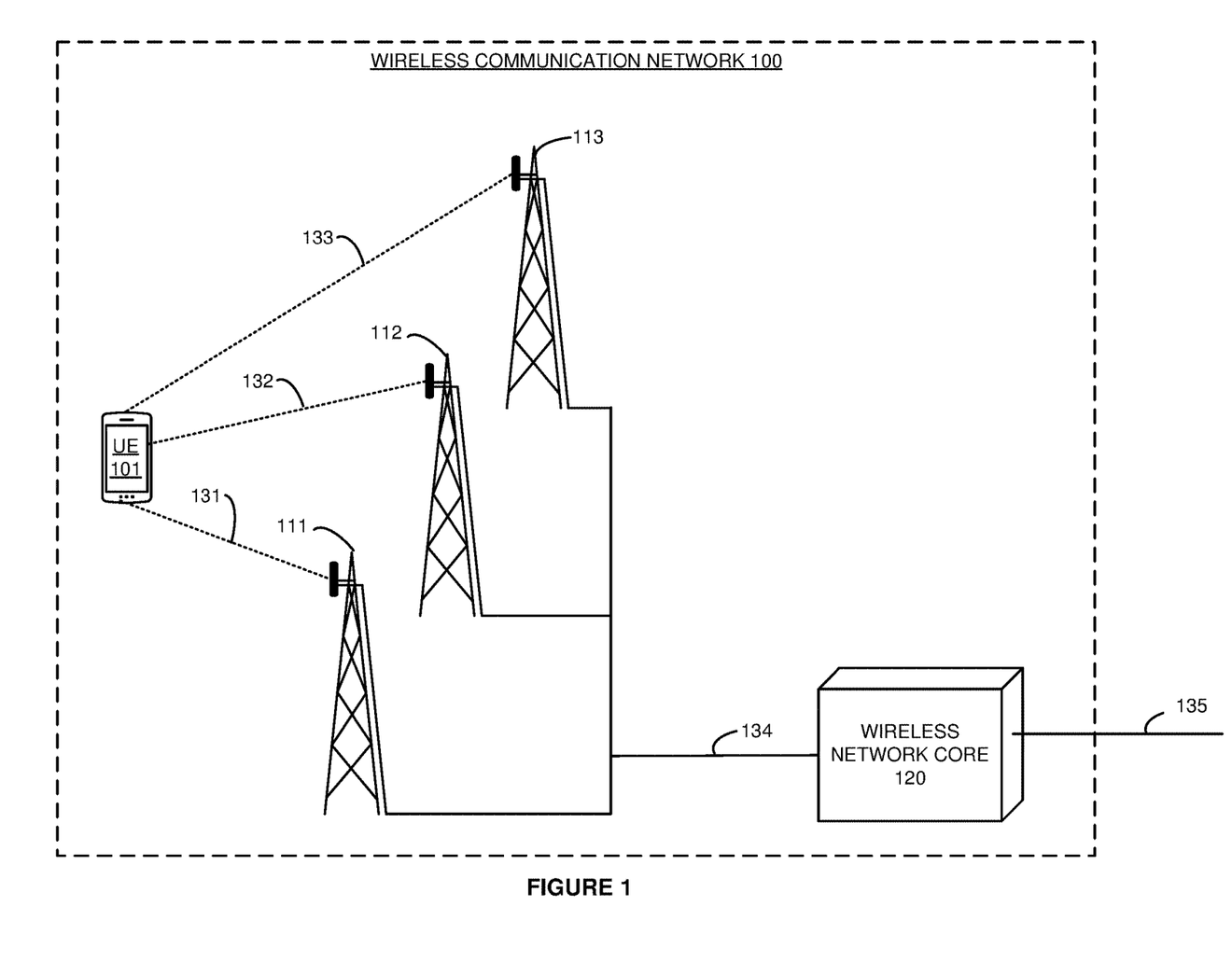
FIG. 1 illustrates a wireless communication network to serve a wireless User Equipment (UE) with dynamic data rates based on historical data rates and serving radio bands.

FIG. 1 illustrates wireless communication network 100 to serve wireless User Equipment (UE) 101 with dynamic data rates based on historical data rates and serving radio bands 131-133. Wireless communication network 100 delivers wireless data services to UE 101 like internet-access, video-calling, media-streaming, augmented-reality, machine-control, and/or some other wireless networking product. Wireless communication network 100 comprises wireless UE 101, wireless access nodes 111-113, and wireless network core 120. The number of UEs, wireless access nodes, and wireless network cores that are depicted on FIG. 1 has been restricted for clarity, and wireless communication network 100 may comprise many more UEs, wireless access nodes, and wireless network cores. Although UE 101 is shown coupled to all three wireless access nodes 111-113 on FIG. 1, UE 101 is often coupled to only one or two of access nodes 111-113 at a time.

Various examples of network operation and configuration are described herein. In some examples, wireless network core 120 and wireless access nodes 111-113 exchange initial data for UE 101 with using initial data rates. Wireless access nodes 111-113 wirelessly exchange the initial data with wireless UE 101 over radio bands 131-133. Subsequently, only wireless access node 112 serves UE 101 over radio band 132. In response to wireless access node 112 serving UE 101, wireless network core 120 determines a new data rate for UE 101 as follows. Wireless network core 120 determines a data rate level for wireless UE 101 based on the initial data rates—like determining the average data rate for UE 101 over the past 15 days. The actual data rates experienced by UE 101 over backhaul links 1134 varies from the maximum levels set by wireless network core 120, and the initial data rates comprise the actual data rates as measured by wireless network core 120. Wireless network core 120 identifies the serving one of wireless access nodes 111-113 for UE 101. When wireless access node 112 is serving UE 101, wireless network core 120 identifies radio band 132 as the serving radio band. Wireless network core 120 determines a new data rate for UE 101 based on the data rate level and serving radio band 132. Wireless network core 120 typically increases the new data rate when the serving radio band capacity has increased and/or the data rate level has increased, and wireless network core 120 typically decreases the new data rate when the serving radio band capacity has decreased and/or the data rate level has decreased. Wireless network core 120 and wireless access node 112 exchange new data for UE 101 using the new data rate. Wireless access node 112 wirelessly exchanges the new data with wireless UE 101 over radio band 132. Advantageously, wireless network core 120 efficiently and effectively moves the backhaul data rates for UE 101 closer to the actual data rates experienced by UE 101 to reduce resource overallocation. Moreover, wireless network core 120 factors in the serving one of radio bands 131-133 to better control the backhaul data rates for UE 101 based on wireless link capability to further reduce resource overallocation.

Wireless UE 101 and wireless access nodes 111-113 wirelessly communicate over radio bands 131-133 using Radio Access Technologies (RATs) like Fifth Generation New Radio (5GNR), Millimeter Wave (MMW), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. Radio bands 131-133 may comprise blocks of Federal Communication Commission (FCC) licensed radio spectrum.

Wireless access nodes 111-113 communicate with wireless network core 120 over backhaul links 134. Wireless network core 120 communicates with external systems over external links 135. Links 134-135 use metal, glass, air, or some other media. Links 134-135 use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, interprocessor communication, bus interfaces, and/or some other data communication protocols.

Although UE is 101 depicted as a smartphone, UE 101 might instead comprise a computer, robot, vehicle, or some other data appliance with wireless communication circuitry. Wireless access nodes 111-113 are depicted as towers, but access nodes 111-113 may use other mounting structures or no mounting structure at all. Wireless access nodes 111-113 may comprise gNodeBs, eNodeBs, MMW hot-spots, LP-WAN base stations, relay-UEs, and/or some other form of wireless network transceivers.

Wireless UE 101 and wireless access nodes 111-113 comprise antennas, amplifiers, filters, modulation, and analog/digital interfaces. UE 101, access nodes 111-113, and wireless network core 120 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein. Wireless network core 120 comprises network elements like Access and Mobility Management Function (AMF), Authentication and Security Function (AUSF), Network Slice Selection Function (NSSF), Policy Control Function (PCF), Session Management Function (SMF), Application Function (AF), User Plane Function (UPF), and/or some other network apparatus. In some examples, the network elements in wireless network core 120 comprise Virtual Network Functions (VNFs) in a Network Function Virtualization Infrastructure (NFVI).

Figure 2:
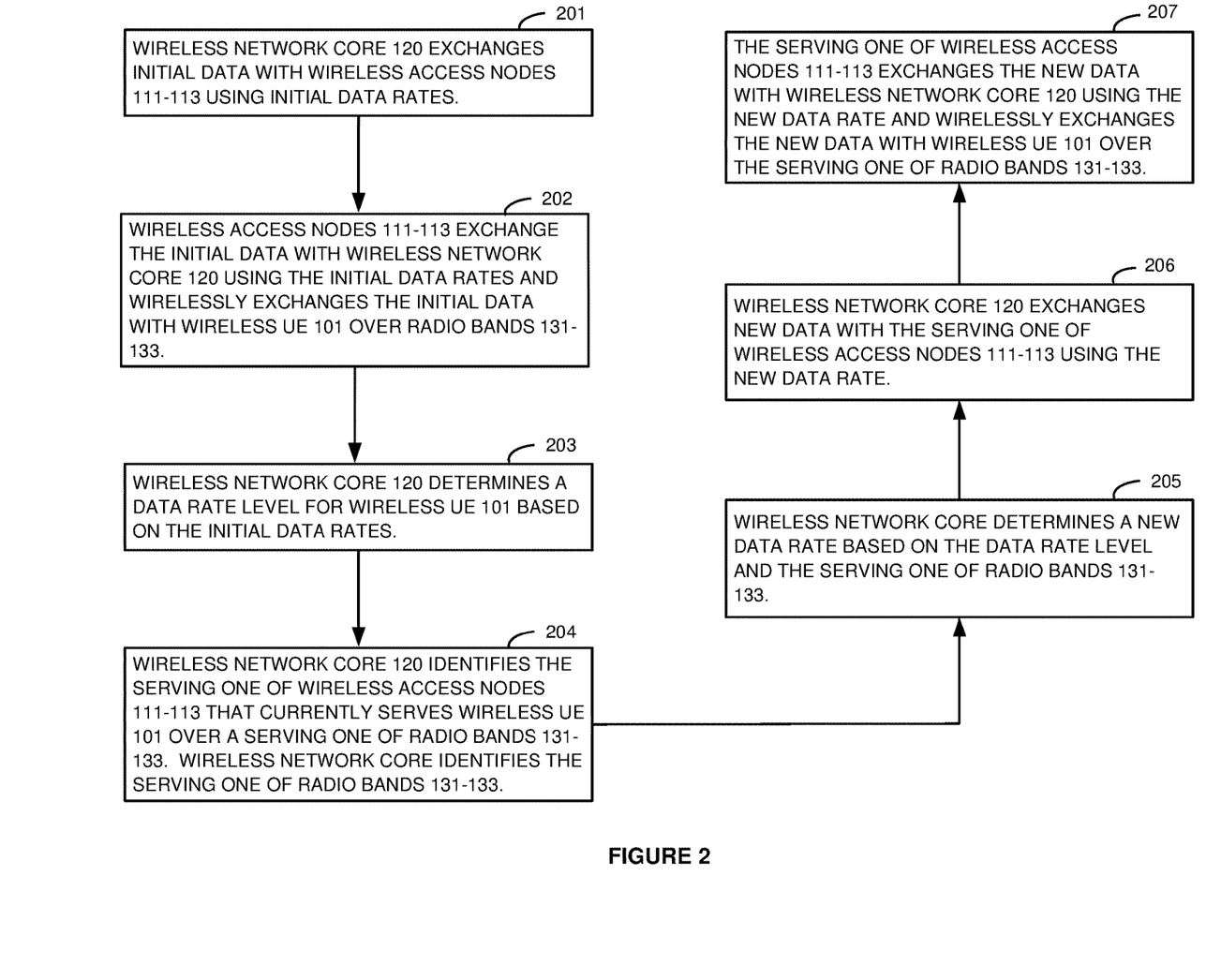
FIG. 2 illustrates an exemplary operation of the wireless communication network to serve the wireless UE with the dynamic data rates based on the historical data rates and the serving radio bands.

FIG. 2 illustrates an exemplary operation of wireless communication network 100 to serve wireless UE 101 with the dynamic data rates based on the historical data rates and serving radio bands 131-133. Wireless network core 120 exchanges initial data with wireless access nodes 111-113 using initial data rates (201). Wireless access nodes 111-113 exchange the initial data with wireless network core 120 using the initial data rates (202). Wireless access nodes 111-113 wirelessly exchange the initial data with wireless UE 101 over radio bands 131-133 (202). Wireless network core 120 determines a data rate level for wireless UE 101 based on the initial data rates which are actual data rates that are measured by wireless network core 120 (203). Wireless network core 120 identifies one of wireless access nodes 111-113 that currently serves UE 101 (204). Wireless network core 120 identifies one of radio bands 131-133 that currently serves UE 101 (204). Wireless network core 120 determines a new data rate for UE 101 based on the data rate level and the serving one of radio bands 131-133 (205). Wireless network core 120 exchanges new data with the serving one of wireless access nodes 111-113 using the new data rate. The serving one of wireless access nodes 111-113 exchanges the new data with wireless network core 120 using the new data rate. The serving one of wireless access nodes 111-113 wirelessly exchanges the new data with wireless UE 101 over the serving one of radio bands 131-133 (207).

Figure 3:
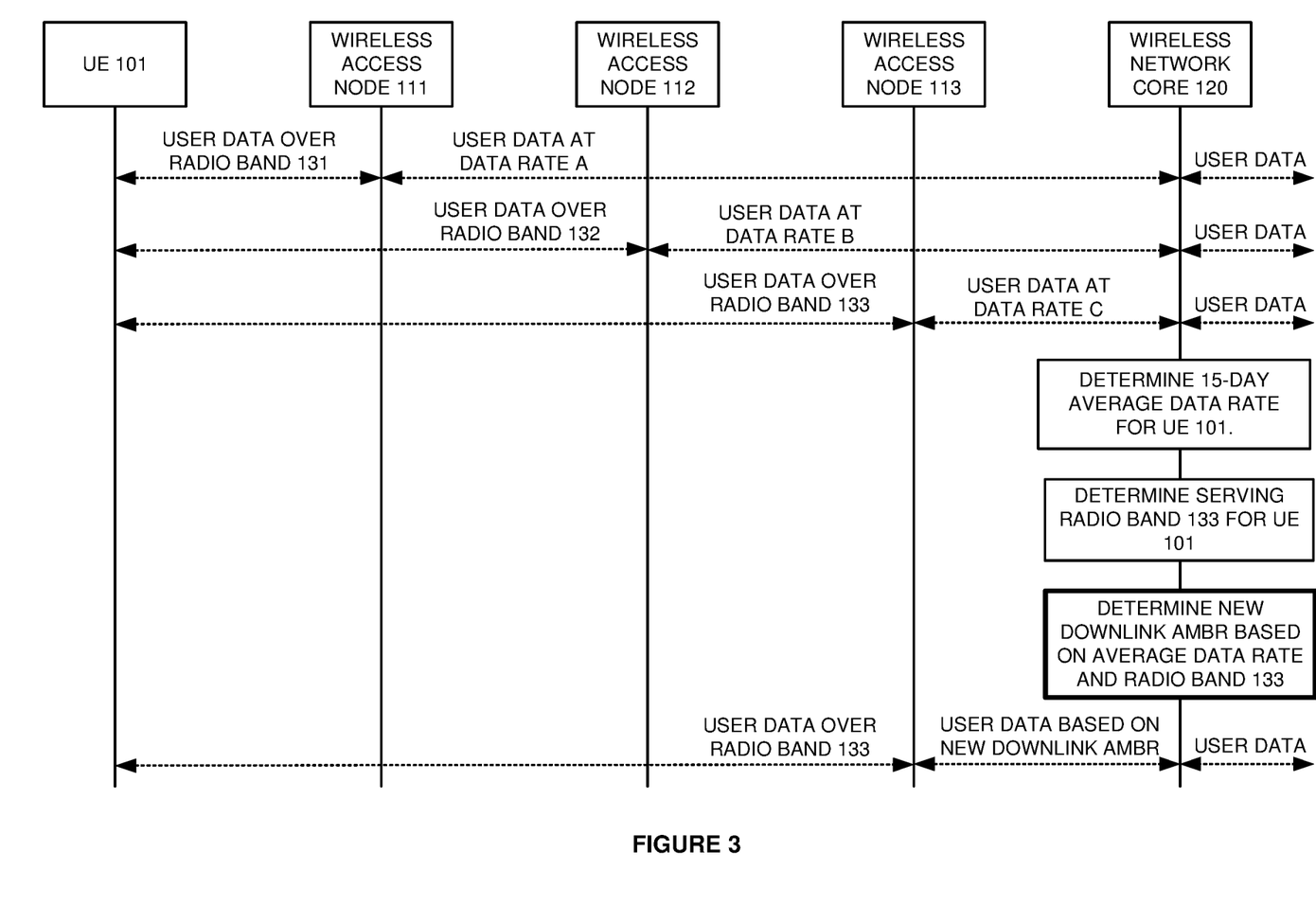
FIG. 3 illustrates an exemplary operation of the wireless communication network to serve the wireless UE with the dynamic data rates based on the historical data rates and the serving radio bands.

FIG. 3 illustrates an exemplary operation of wireless communication network 100 to serve wireless UE 101 with the dynamic data rates based on the historical data rates and the serving ones of radio bands 131-133. In this example, the data rate level comprises a 15-day running average, and the data rate comprises a downlink Ambient Bit Rate (AMBR). The data rate level and the data rate may differ in other examples. Wireless UE 101 and wireless access node 111 wirelessly exchange user data over radio band 131. Wireless access node 111 and wireless network core 120 exchange the user data using data rate A. Wireless UE 101 and wireless access node 112 wirelessly exchange user data over radio band 132. Wireless access node 112 and wireless network core 120 exchange the user data using data rate B. Wireless UE 101 and wireless access node 113 wirelessly exchange user data over radio band 133. Wireless access node 113 and wireless network core 120 exchange the user data using data rate C. Wireless network core 120 exchanges the user data with external systems.

Wireless network core 120 determines a 15-day average data rate for wireless UE 101 based on measured and actual data rates A, B, and C. Wireless network core 120 identifies the currently serving wireless access node for UE 101 which is wireless access node 113 in this example. Wireless network core 120 identifies the currently serving radio band for UE 101 which is radio band 133 in this example. Wireless network core 120 determines a new downlink AMBR for UE 101 based on the 15-day running average data rate for UE 101 and serving radio band 133. For example, wireless network core 120 may host a data structure that translates the average data rate and serving radio band into the new downlink AMBR. Wireless UE 101 and wireless access node 113 wirelessly exchange subsequent user data over radio band 133. Wireless access node 113 and wireless network core 120 exchange the subsequent user data over backhaul links 134 using the new downlink AMBR. Wireless network core 120 exchanges the subsequent user data with external systems.

Figure 4:
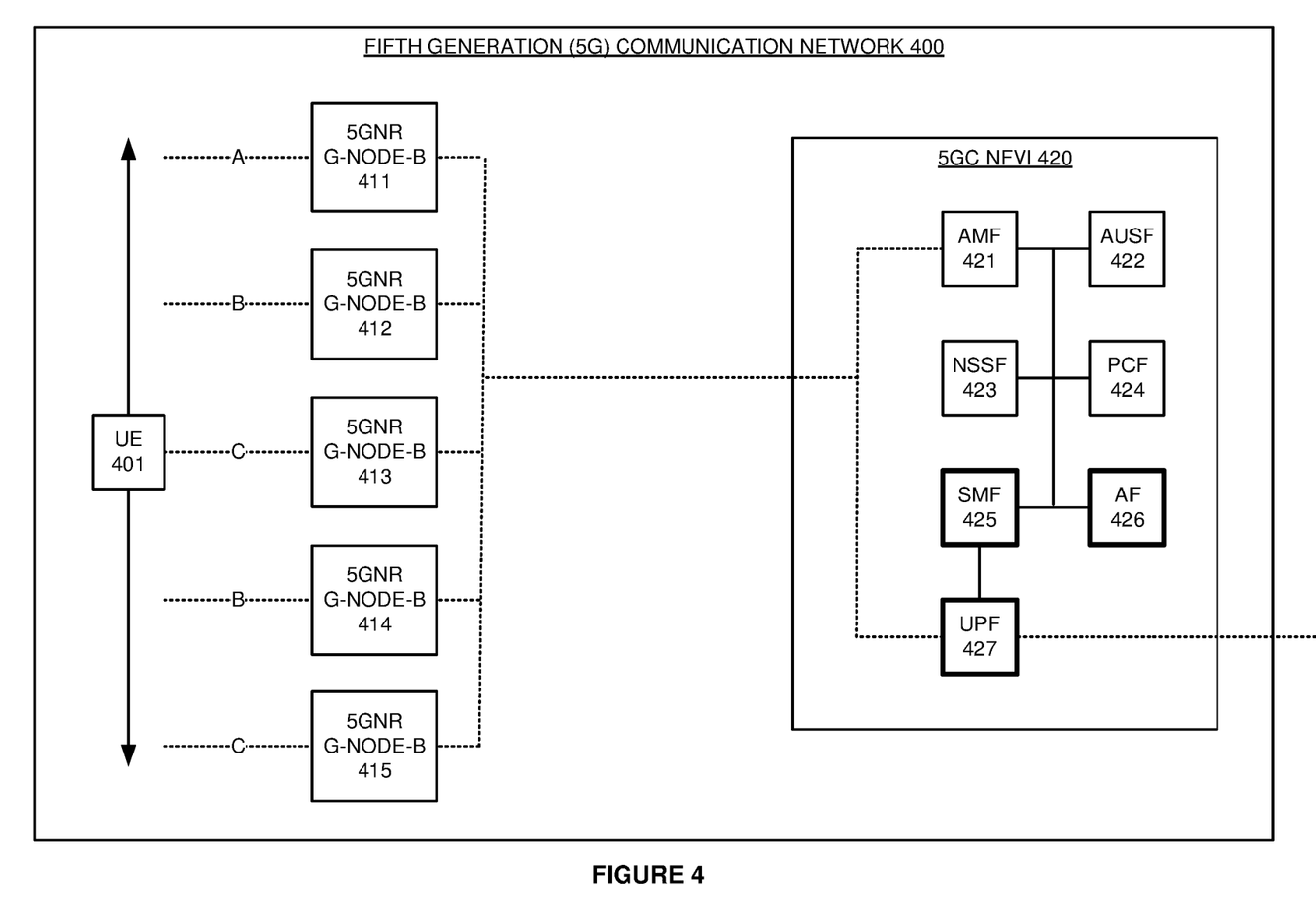
FIG. 4 illustrates a Fifth Generation (5G) communication network to serve a wireless UE with dynamic data rates based on historical data rates and serving radio bands.

FIG. 4 illustrates a Fifth Generation (5G) communication network 400 to serve wireless UE 401 with dynamic data rates based on historical data rates and serving radio bands. 5G communication network 400 comprises an example of wireless communication network 100, although network 100 may differ. 5G communication network 400 delivers wireless data services to UE 401 like internet-access, video-calling, media-streaming, augmented-reality, machine-control, and/or some other wireless networking product. 5G communication network 400 comprises UE 401, 5GNR gNodeBs 411-415, and Fifth Generation Core Network Function Virtualization Infrastructure (5GC NFVI) 420. NFVI 420 comprises Access and Mobility Management Functions (AMF) 421, Authentication and Security Functions (AUSF) 422, Network Slice Selection Functions (NSSF) 423, Policy Control Functions (PCF) 424, Session Management Functions (SMF) 425, Application Functions (AFs) 426, and User Plane Functions (UPF) 427.

UE 401 moves about and occasionally communicates wirelessly with 5GNR gNodeB 411 over radio band A. UE 401 occasionally communicates wirelessly with 5GNR gNodeB 412 over radio band B and with 5GNR gNodeB 413 over radio band C. UE 401 occasionally communicates wirelessly with 5GNR gNodeB 414 over radio band B and with 5GNR gNodeB 415 over radio band C. UPF 427 exchanges user data for UE 401 with external systems. UPF 427 and 5GNR gNodeBs 411-415 exchange the user data for UE 101. 5GNR gNodeBs 411-415 wirelessly exchange the user data with UE 101 over radio bands A, B, and C. UPF 427 tracks the downlink data rates for UE 401 on a per slice basis. UPF 427 determines a running 15-day average downlink data rate for UE 401 that comprises the amount of transferred downlink data over the last 15 days divided by the amount of time in seconds for the downlink data transfers to occur. UPF 427 loads the average per-slice data rates for UE 401 into a data structure hosted by SMF 425.

Subsequently, UE 401 attaches to 5GNR gNodeB 413 over radio band C. 5GNR gNodeB 413 transfers N2/N1 signaling to for UE 401 to AMF 421 in NFVI 420. AMF 421 interacts with AUSF 422 and UE 401 to authenticate UE 401. AMF 421 interacts with NSSF 423 to select network slices for UE 401. AMF 421 interacts with PCF 424 and SMF 425 to select Dynamic Network Names (DNNs), Quality-of-Service Flow Indicators (QFIs), and Internet Protocol (IP) addresses for the network slices and UE 401. The selected QFIs indicate downlink Ambient Bit Rates (AMBRs) for specific network slices. The downlink AMBR comprises a maximum downlink data rate for all non-Guaranteed Bit Rate (non-GBR) connections for one or more Packet Data Networks (PDNs). The actual data rates experienced by the wireless user devices over the backhaul data links vary from these maximum levels in the AMBRs based on network conditions, user activity, and the like. SMF 425 selects the downlink AMBRs for the specific network slices based on the average per-slice data rates and the serving radio bands. SMF 425 hosts the data structure that translates 5GNR gNodeBs IDs into their radio bands. The data structure then translates UE IDs into their running 15-day average per-slice downlink data rates (as loaded by UPF 427). The data structure translates the serving radio bands and average per-slice data rates into new downlink AMBRs for the specific network slices.

AMF 431 signals 5GNR gNodeB 413 with the network slices, DNNs, QFIs, IP addresses, and the like for UE 401. 5GNR gNodeB 413 signals UE 401 with the network slices, DNNs, QFIs, IP addresses, and the like. 5GNR SMF 425 signals UPF 427 to serve UE 401 over the network slices based on the DNNs, QFIs, IP addresses. UE 401 and 5GNR gNodeB 413 wirelessly exchange user data over radio band C. 5GNR gNodeB 413 and UPF 427 exchange the user data using the per-slice downlink AMBRs. UPF 427 exchanges the user data with external systems.

Figure 5:
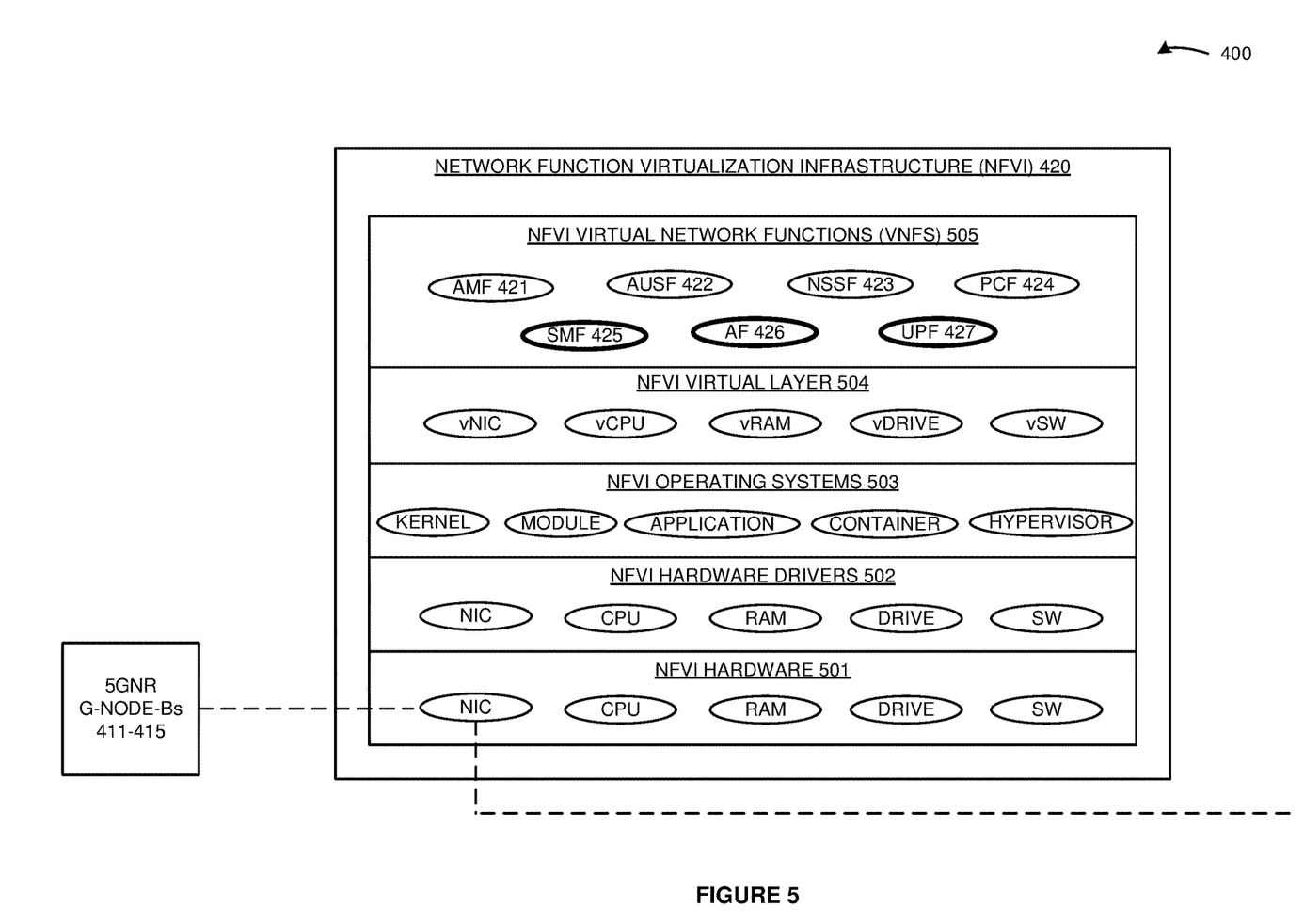
FIG. 5 illustrates a 5GC Network Function Virtualization Infrastructure (NFVI) to serve the wireless UE with the dynamic data rates based on the historical data rates and serving radio bands.

FIG. 5 illustrates 5GC Network Function Virtualization Infrastructure (NFVI) 420 to serve wireless UE 401 with the dynamic data rates based on the historical data rates and the serving radio bands. NFVI 420 comprises an example of wireless network core 120, although network core 120 may differ. NFVI 420 comprises NFVI hardware 501, NFVI hardware drivers 502, NFVI operating systems 503, NFVI virtual layer 504, and NFVI Virtual Network Functions (VNFs) 505. NFVI hardware 501 comprises Network Interface Cards (NIC), CPU, RAM, flash/disk drives, and data switches (SW). NFVI hardware drivers 502 comprise software that is resident in the NIC, CPU, RAM, DRIVE, and SW. NFVI operating systems 503 comprise kernels, modules, applications, containers, hypervisors, and the like. NFVI virtual layer 504 comprises virtual NICs (vNIC), virtual CPUs (vCPU), virtual RAM (vRAM), virtual Drives (vDRIVE), and virtual Switches (vSW). NFVI VNFs 505 comprise Access and Mobility Management Functions (AMF) 432, Authentication and Security Functions (AUSF) 422, Network Slice Selection Functions (NSSF) 423, Policy Control Functions (PCF) 424, Session Management Functions (SMF) 425, Application Functions (SF) 426, and User Plane Functions (UPF) 427. Other VNFs are typically present but are omitted for clarity.

The NIC are coupled to 5GNR gNodeBs 411-415 and external systems. NFVI hardware 501 executes NFVI hardware drivers 502, NFVI operating systems 503, NFVI virtual layer 504, and NFVI VNFs 505 to serve UE 401 over 5GNR gNodeBs 411-415. NFVI 420 exchanges 5GC signaling and data with 5GNR gNodeBs 411-415 to serve UE 401 with the wireless data services. NFVI 420 exchanges some of the data with external systems.

5GNR gNodeBs 411-415 and UE 401 wirelessly exchange 5GNR network signaling and user data. 5GNR gNodeBs 411-415 exchange corresponding 5GC N2/N1 signaling with AMF 421 and exchange corresponding 5GC N3 data with UPF 427. UPF 427 exchanges corresponding N6 data with external systems. UPF 427 tracks downlink data rates for UE 401 on a per-slice basis and maintains per-slice average data rates for UE 401 in SMF 425.

When UE 401 attaches to one of 5GNR gNodeBs 411-415, the serving one of 5GNR gNodeBs 411-415 transfers N2/N1 signaling for UE 401 to AMF 421 in NFVI 420. AMF 421 interacts with AUSF 422 and UE 401 to authenticate UE 401. AMF 421 interacts with NSSF 423 to select network slices for UE 401. AMF 421 interacts with PCF 424 and SMF 425 to select DNNs, QFIs, IP addresses, and the like for UE 401 and the network slices. The selected QFIs indicate downlink AMBRs. SMF 425 selects the downlink AMBRs for the network slices based on the average per-slice data rates for UE 401 and based on the serving radio bands.

AMF 431 transfers 5GC N2/N1 signaling to the serving one of 5GNR gNodeBs 411-415 with the selected network slices, DNNs, QFIs, IP addresses, and the like for UE 401. 5GNR SMF 425 signals UPF 427 to serve UE 401 over the network slices based on the DNNs, QFIs, and IP addresses. The serving one of 5GNR gNodeBs 411-415 and UPF 427 exchange the user data using the downlink per-slice AMBRs specified by SMF 425 in the QFIs. UPF 427 exchanges N6 user data with external systems.

Figure 6:
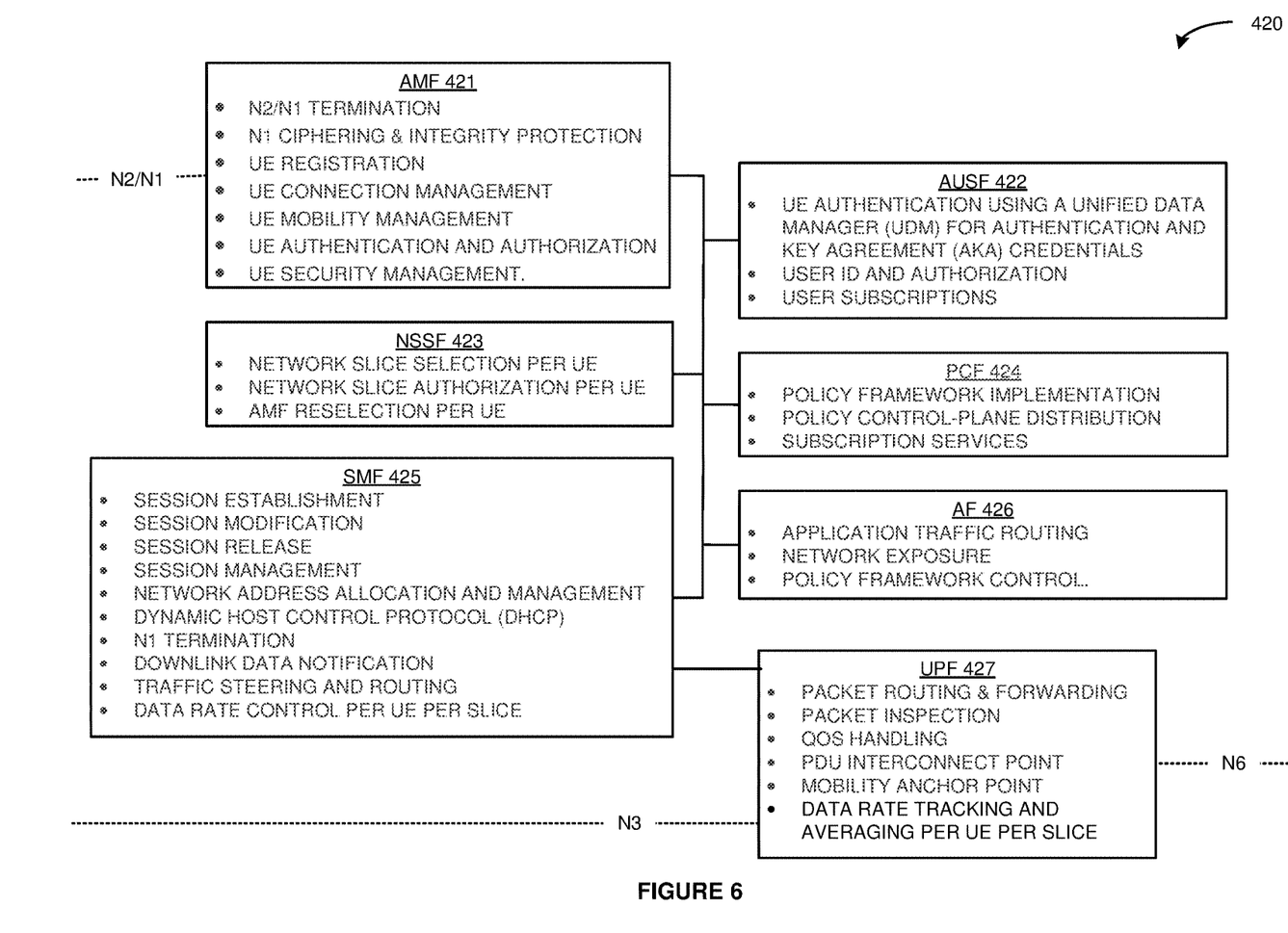
FIG. 6 illustrates the 5GC NFVI to serve the wireless UE with the dynamic data rates based on the historical data rates and serving radio bands.

FIG. 6 illustrates 5GC NFVI 420 to serve wireless UE 401 with the dynamic data rates based on the historical data rates and the serving radio bands. AMP 421 performs N1 termination. N1 ciphering & integrity protection. UE registration, UE connection management, UE mobility management, UE authentication and authorization, and UP security management. AUSF 422 performs UP authentication using a Unified Data Manager (UDM) for Authentication and Key Agreement (AKA) credentials, user IDs, authorizations, subscriptions NSSF 423 performs network slice selection per UE, network slice authorization per UP, and AMF selection per UP. PCF 424 performs policy framework implementation, policy control-plane distribution, and subscription services. SMF 425 performs session establishment, session modification, session release, session management, network address allocation, network address management, Dynamic Host Control Protocol (DHCP). N1 termination, downlink data notification, traffic steering and routing. AF 426 performs application traffic routing, network exposure, and policy framework control. UPF 427 performs packet routing & forwarding, packet inspection, QoS handling, PDU interconnection, and mobility anchoring.

AMF 421 exchanges N2/N1 signaling with 5GNR gNodeBs 411-415 over backhaul links, UPF 427 exchanges N3 data with 5GNR gNodeBs 411-415 over the backhaul links. UPF 427 also exchanges corresponding N6 data with external systems. UPF 427 tracks the downlink per-slice data rates for UE 401 and maintains running per-slice averages of the downlink data rates.

When AMF 421 receives N2/N1 attachment signaling for UE 401, AMF 421 interacts with AUSF 422 and UE 401 to authenticate UE 401. AMF 421 interacts with NSSF 423 to select network slices for UE 401. AMF 421 interacts with PCF 424 and SMF 425 to select DNNs, QFIs, and IP addresses for the network slices and UE 401. The selected QFIs indicate downlink AMBRs for the network slices. The downlink AMBR(s) for a specific network slice are selected by SMF 425 based on the serving radio band and the average per-slice data rate for UE 401 and that network slice. SMF 425 hosts a data structure that translates gNodeB IDs into radio band IDs, translates UE IDs into per-slice downlink data rates (tracked by UPF 427), and translates the per-slice AMBRs and serving radio band into new per-slice AMBRs. SMF 425 increases the downlink AMBR for a slice when the serving radio band capacity increases and/or the average per-slice data rate increases. SMF 425 decreases the new downlink AMBR for the slice when the serving radio band capacity decreases and/or the average per-slice data rate decreases.

AMF 431 transfers 5GC N2/N1 signaling to the serving one of 5GNR gNodeBs 411-415 with the selected network slices, DNNs, QFIs, IP addresses, and the like for UE 401. 5GNR SMF 425 signals UPF 427 to serve UE 401 over the network slices based on the DNNs, QFIs, and IP addresses. The serving one of 5GNR gNodeBs 411-415 and UPF 427 exchange the user data using the downlink per-slice AMBRs as specified in the QFIs by SMF 425. UPF 427 exchanges the corresponding N6 user data with external systems.

Figure 7:
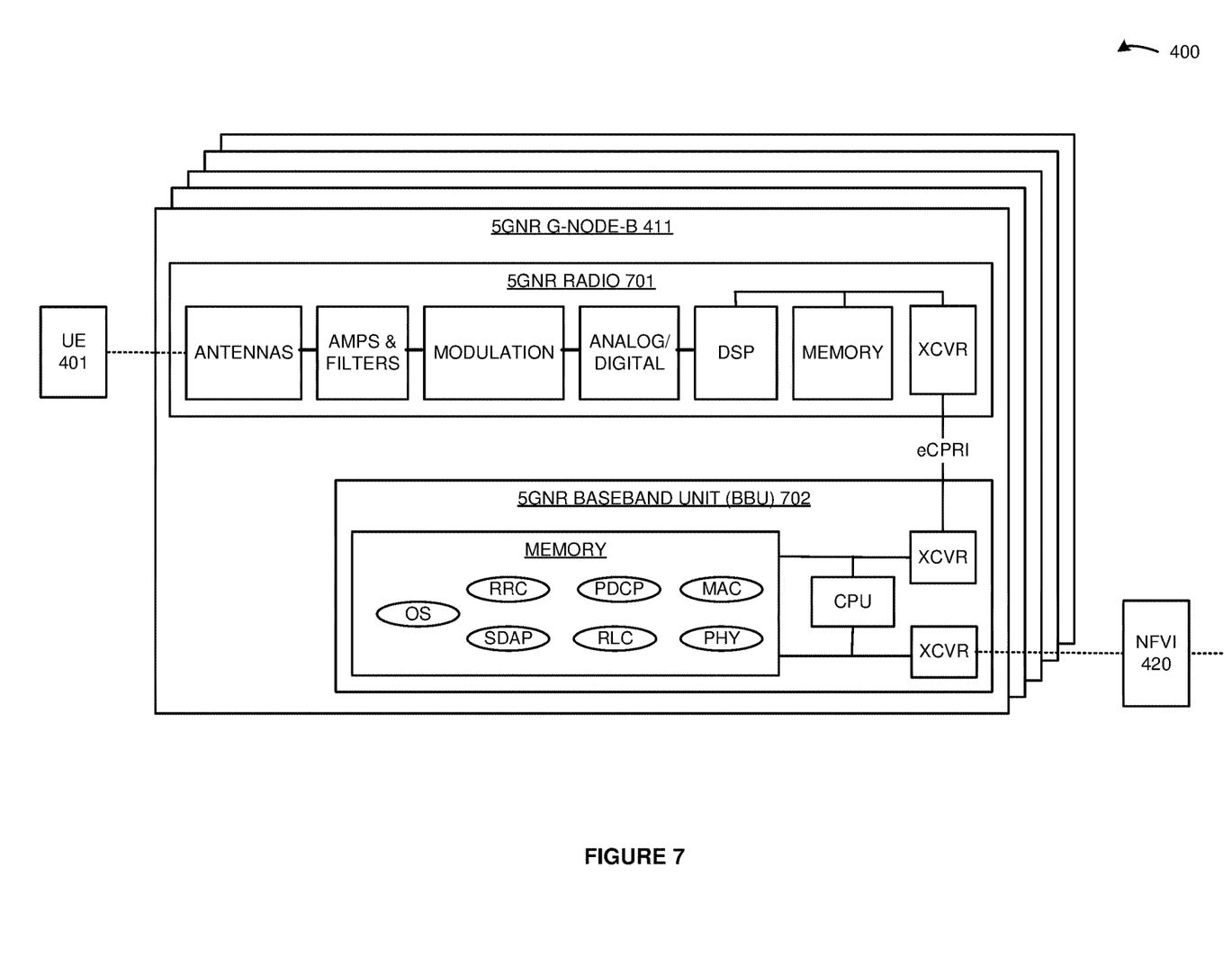
FIG. 7 illustrates a Fifth Generation New Radio (5GNR) gNodeB to serve the wireless UE with the dynamic data rates based on the historical data rates and serving radio band.

FIG. 7 illustrates Fifth Generation New Radio (5GNR) gNodeB 411 to serve wireless UE 401 with the dynamic data rates based on the historical data rates and serving radio band. 5GNR gNodeB 411 comprises an example of wireless access nodes 111-113, although access nodes 111-113 may differ. 5GNR gNodeBs 412-415 would be similar to 5GNR gNodeB 411. 5GNR gNodeB 420 comprises 5GNR radio 701 and 5GNR Baseband Unit (BBU) 702. 5GNR radio 701 comprises antennas, amplifiers, filters, modulation, analog-to-digital interfaces, DSP, memory, and transceivers that are coupled over bus circuitry. 5GNR BBU 702 comprises memory, CPU, and transceivers (XCVRs) that are coupled over bus circuitry. The memory in 5GNR BBU 702 stores an operating system and 5GNR network applications like Physical Layer (PHY), Media Access Control (MAC), Radio Link Control (RLC), Packet Data Convergence Protocol (PDCP), Service Data Adaptation Protocol (SDAP), and Radio Resource Control (RRC). 5GNR BBU 702 may be physically separated into a Distributed Unit (DU) and a Centralized Unit (CU) that each resemble BBU 702. The CU and DU would each host a portion of the software in BBU 702 and would be coupled over fronthaul links.

UE 401 is wirelessly coupled to the antennas in 5GNR radio 701 over 5GNR links in radio band A. Transceivers in 5GNR 701 are coupled to transceivers in 5GNR BBU 702 over enhanced CPRI (eCPRI) links. Transceivers in 5GNR BBU 702 are coupled to NFVI 420 over backhaul links. The CPU in 5GNR BBU 702 executes the operating system, PHY, MAC, RLC, PDCP, SDAP, and RRC to exchange 5GNR signaling and data with UE 401 and to exchange 5GC/X2 signaling and data with NFVI 420 and other NodeBs. AMF 431 in NFVI 420 directs the RRC in 5GNR BBU 702 to serve UE 401 based on their selected network slices, DNNs, QFIs, network addresses, and the like.

In 5GNR radio 701, the antennas receive wireless 5GNR signals from 5GNR UE 401 that transport uplink 5GNR signaling and data over radio band A. The antennas transfer corresponding electrical uplink signals through duplexers to the amplifiers. The amplifiers boost the electrical uplink signals for filters which attenuate unwanted energy. Demodulators down-convert the filtered uplink signals from their carrier frequency. The analog/digital interfaces convert the demodulated analog uplink signals into digital uplink signals for the DSPs. The DSPs recover uplink 5GNR symbols from the uplink digital signals. In 5GNR BBU 702, the CPU executes the network applications to process the uplink 5GNR symbols and recover the uplink 5GNR signaling and data. The network applications process the uplink 5GNR signaling, downlink 5GC N2 signaling, and X2 signaling to generate new downlink 5GNR signaling, new uplink 5GC N2 signaling, and new X2 signaling. The RRC transfers the new uplink 5GC N2/N1 signaling to NFVI 420 and the X2 signaling to other NodeBs. The SDAP transfers corresponding 5GC N3 data to NFVI 420 and the other NodeBs.

In 5GNR BBU 702, the RRC receives the 5GC N2/N1 signaling from NFVI 420 and X2 signaling from the other NodeBs. The SDAP receives 5GC N3 data from NFVI 420 using the per-slice downlink AMBRs selected by NFVI 420. The SDAP receives X2 data from and the other NodeBs. The 5GNR network applications process the new downlink 5GC signaling and data to generate corresponding downlink 5GNR symbols. In 5GNR radio 701, the DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR UE 401 that transport the downlink 5GNR signaling and data over radio band A.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

UE 401 communicates wirelessly with 5GNR radio 701 over radio band A. 5GNR BBU 702 exchanges N2/N1 signaling for UE 401 with NFVI 420. NFVI 420 and 5GNR BBU 702 exchange user data for UE 401 using the per-slice downlink AMBRs. 5GNR BBU 702 exchanges the user data with UE 401 over 5GNR radio 701 and radio band A. 5GNR BBU 702 receives N2 signaling from AMF 431 that indicates the network slices, DNNs, QFIs, IP addresses, and the like for UE 401. 5GNR BBU 702 signals UE 401 over radio 701 with the network slices, DNNs, QFIs, IP addresses, and the like. UE 401 and 5GNR BBU 702 exchange user data over radio band A and radio 701. 5GNR BBU 702 and NFVI 420 exchange the user data using the per-slice downlink AMBRs.

Figure 8:
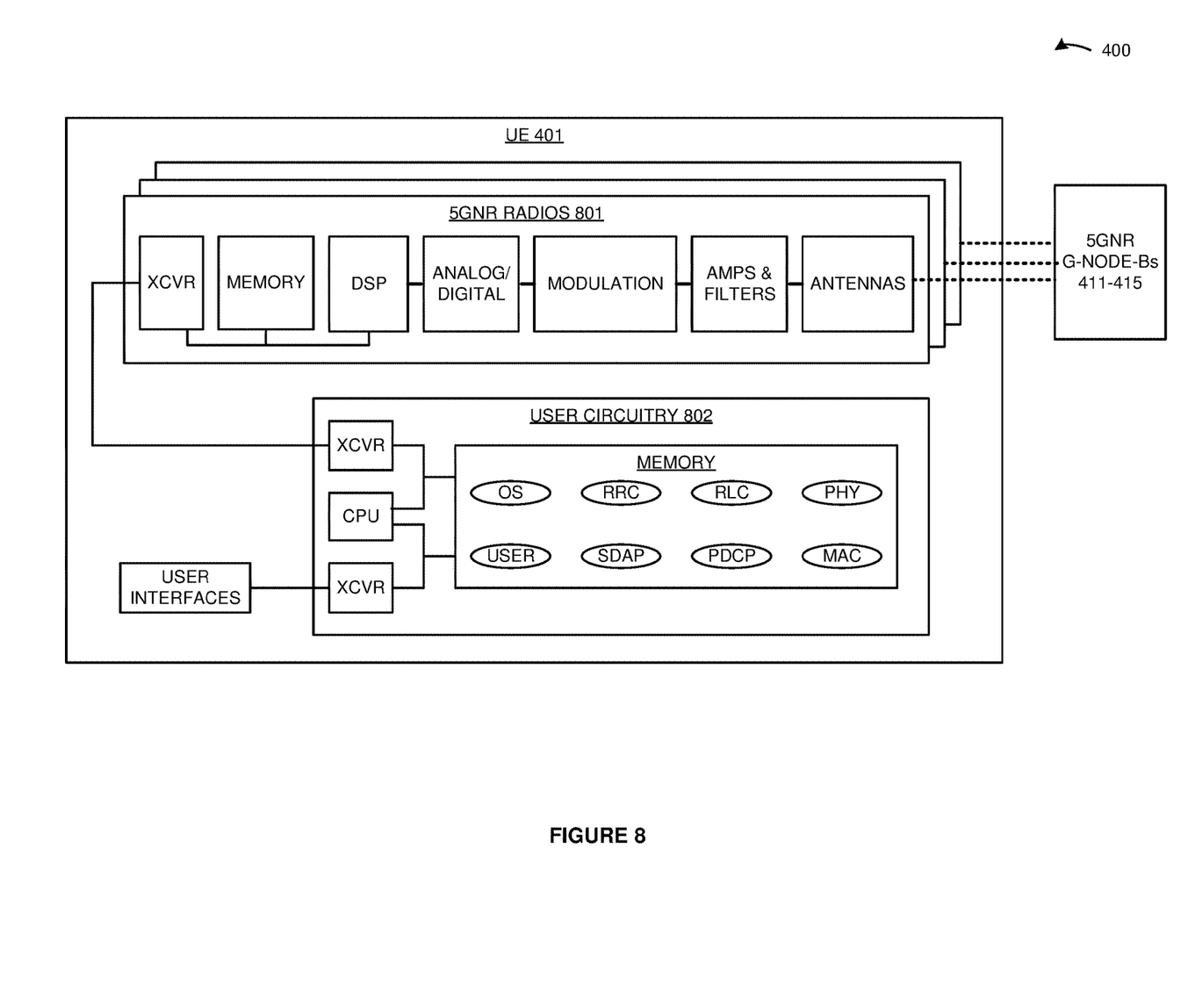
FIG. 8 illustrates the wireless UE that is served with the dynamic data rates based on the historical data rates and serving radio bands.

FIG. 8 illustrates wireless UE 401 that is served with the dynamic data rates based on the historical data rates and the serving radio bands. UE 401 comprises an example of UE 101, although UE 101 may differ. UE 401 comprises 5GNR radios 801 and user circuitry 802. The top one of 5GNR radios 801 is detailed on FIG. 8 and use radio band A. The other ones of 5GNR radios 801 would be similar but would use different radio bands B and C. 5GNR radios 801 each comprise antennas, amplifiers, filters, modulation, analog-to-digital interfaces, DSP, memory, and transceivers that are coupled over bus circuitry. User circuitry 802 comprises memory, CPU, user interfaces, and transceivers that are coupled over bus circuitry. The memory in user circuitry 802 stores an operating system, user applications (USER), and 5GNR network applications for PHY, MAC, RLC, PDCP, SDAP, and RRC.

The antennas in 5GNR radios 801 are wirelessly coupled to 5GNR gNodeBs 411-415 over 5GNR links in radio bands A, B, and C. Transceivers in 5GNR radios 801 are coupled to a transceiver in user circuitry 802. A transceiver in user circuitry 802 is typically coupled to the user interfaces like displays, controllers, memory, and the like. The CPU in user circuitry 802 executes the operating system, PHY, MAC, RLC, PDCP, SDAP, and RRC to exchange 5GNR signaling and data with 5GNR gNodeBs 411-415 over 5GNR radios 801.

In 5GNR radios 801, the antennas receive wireless signals from 5GNR gNodeBs 411-415 over radio bands A, B, and C that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSP. The DSP transfers corresponding 5GNR symbols to user circuitry 802 over the transceivers. In user circuitry 802, the CPU executes the network applications to process the 5GNR symbols and recover the downlink 5GNR signaling and data. The 5GNR network applications receive new uplink signaling and data from the user applications. The network applications process the uplink user signaling the downlink 5GNR signaling to generate new downlink user signaling and new uplink 5GNR signaling. The network applications transfer the new downlink user signaling and data to the user applications.

The 5GNR network applications process the new uplink 5GNR signaling and user data to generate corresponding uplink 5GNR symbols that carry the uplink 5GNR signaling and data. In 5GNR radios 801, the DSPs process the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5GNR gNodeBs 411-415 that transport the uplink 5GNR signaling and data over radio bands A, B, and C.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

Figure 9:
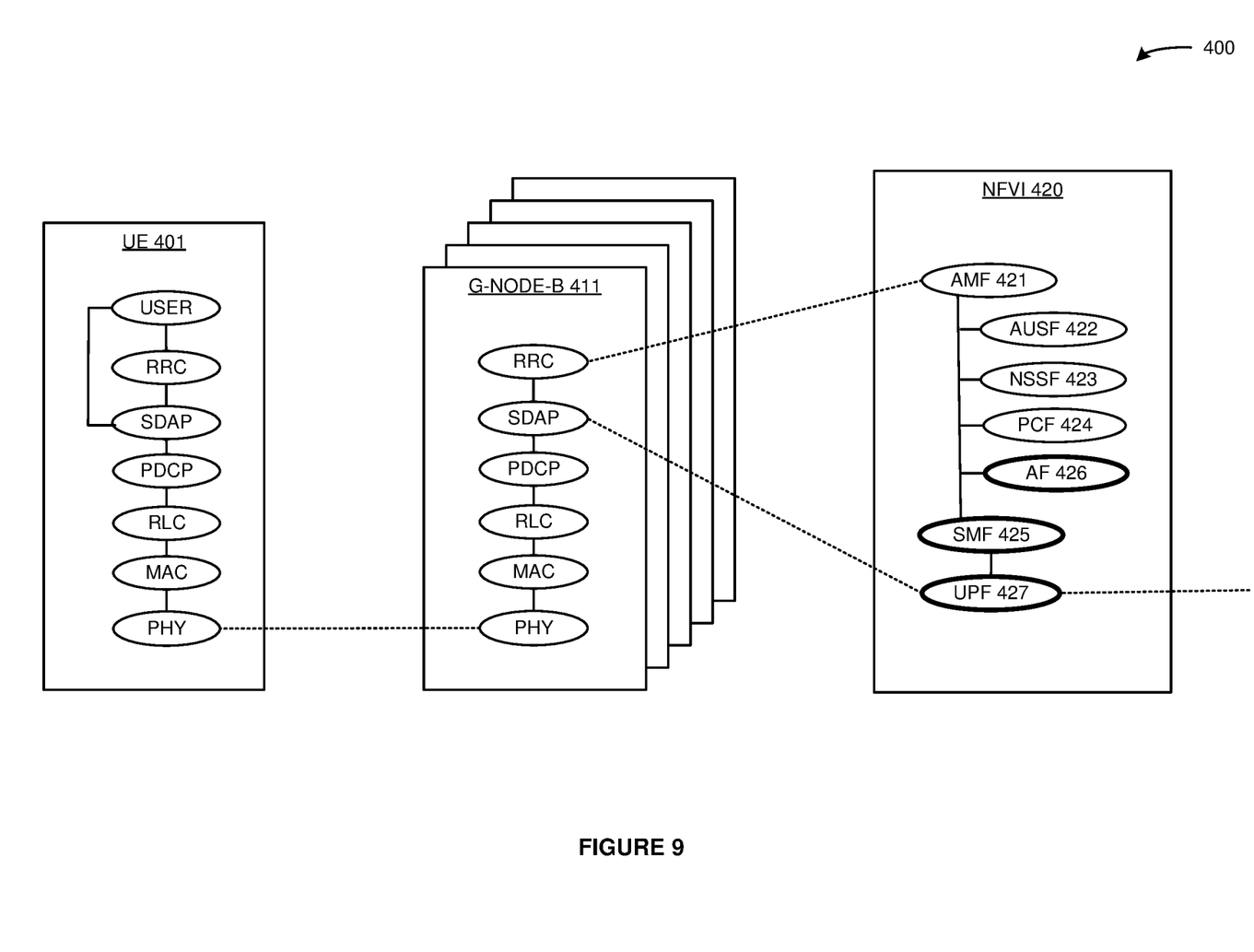
FIG. 9 illustrates an exemplary operation of the 5G communication network to serve the wireless UE with the dynamic data rates based on the historical data rates and serving radio bands.

FIG. 9 illustrates an exemplary operation of 5G communication network 400 to serve wireless UE 401 with the dynamic data rates based on the historical data rates and the serving radio bands. The illustrated operation is exemplary and may vary in other examples. The RRCs in UE 401 and 5GNR gNodeBs 411-415 exchange 5GNR signaling for attachment, mobility, and service control. The RRCs in 5GNR gNodeBs 411-415 and AMF 421 exchange 5GC N2/N1 signaling for the attachment, mobility, and service control for UE 401. AMF 421, AUSF 422, NSSF 423, PCF 424, and SMF 425 interact to authenticate and authorize UE 401, select network slices for UE 401, and select per-slice DNNs, QFIs, and IP addresses for UE 401. The selected per-slice QFIs indicate downlink per-slice AMBRs that were selected by SMF 425 based on the average per-slice data rates and the serving radio bands. SMF 425 hosts the data structure that translates 5GNR gNodeBs IDs into radio bands, translates UE IDs into their average per-slice data rates, and translates the serving radio bands and average per-slice data rates into new downlink per-slice AMBRs. The SDAPs in UE 401 and 5GNR gNodeBs 411-415 exchange 5GNR data for service delivery. The SDAPs in 5GNR gNodeBs 411-415 and UPF 427 exchange corresponding 5GC N3 data for service delivery. In particular, UPF 427 transfers 5GC N3 data to the SDAPs in 5GNR gNodeBs 411-415 using the downlink AMBRs selected by SMF 425. UPF 427 and external systems exchange corresponding N6 data. UPF 427 tracks the downlink data rates for UE 401 on a per slice basis. UPF 427 determines a running 15-day average data rates on a per-slice basis for UE 401. UPF 427 loads the average per-slice downlink data rates for UE 401 into the data structure hosted by SMF 425.

The wireless data network circuitry described above comprises computer hardware and software that form special-purpose network circuitry to serve wireless UEs with dynamic data rates based on historical data rates and serving radio bands. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs with dynamic data rates based on historical data rates and serving radio bands.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless User Equipment (UE) over a backhaul link, the method comprising:
    a wireless network core identifying a wireless access node and a radio band for the wireless UE;
    the wireless network core selecting a backhaul data rate for the wireless UE based on the radio band for the wireless UE;
    in the wireless network core, a user plane exchanging user data with the wireless access node over the backhaul link using the selected backhaul data rate;
    the wireless access node exchanging the user data with the user plane in the wireless network core over the backhaul link using the selected backhaul data rate; and
    the wireless access node wirelessly exchanging the user data with the wireless UE over the radio band.

2. The method of claim 1 wherein the wireless network core selecting the backhaul data rate based on the radio band comprises selecting an average data rate based on the radio band.

3. The method of claim 1 wherein the wireless network core selecting the backhaul data rate based on the radio band comprises selecting an Ambient Bit Rate (AMBR) based on the radio band.

4. The method of claim 1 wherein the wireless network core selecting the backhaul data rate based on the radio band comprises selecting a downlink Ambient Bit Rate (AMBR) based on the radio band.

5. The method of claim 1 wherein the wireless network core selecting the backhaul data rate based on the radio band comprises a Session Management Function (SMF) selecting the backhaul data rate based on the radio band.

6. The method of claim 1 wherein the wireless network core selecting the backhaul data rate based on the radio band comprises a Policy Control Function (PCF) selecting the backhaul data rate based on the radio band.

7. The method of claim 1 wherein the wireless network core selecting the backhaul data rate based on the radio band comprises an Access and Mobility Management Function (AMF) selecting the backhaul data rate based on the radio band.

8. The method of claim 1 wherein the user plane in the wireless network core exchanging the user data with the wireless access node over the backhaul link using the selected backhaul data rate comprises a User Plane Function (UPF) in the wireless network core exchanging the user data with the wireless access node over the backhaul data link using the selected backhaul data rate.

9. The method of claim 1 wherein the wireless access node comprises a Fifth Generation New Radio (5GNR) access node.

10. The method of claim 1 wherein the radio band comprises a block of Federal Communication Commission (FCC) licensed radio spectrum.

11. A wireless communication network to serve a wireless User Equipment (UE) over a backhaul link, the wireless communication network comprising:
- a wireless network core configured to identify a wireless access node and a radio band for the wireless UE;
- the wireless network core configured to select a backhaul data rate for the wireless UE based on the radio band for the wireless UE;
- in the wireless network core, a user plane configured to exchange user data with the wireless access node over the backhaul link using the selected backhaul data rate;
- the wireless access node configured to exchange the user data with the user plane in the wireless network core over the backhaul link using the selected backhaul data rate; and
- the wireless access node configured to wirelessly exchange the user data with the wireless UE over the radio band.

12. The wireless communication network of claim 11 wherein the wireless network core is configured to select an average data rate based on the radio band to select the backhaul data rate based on the radio band.

13. The wireless communication network of claim 11 wherein the wireless network core is configured to select an Ambient Bit Rate (AMBR) based on the radio band to select the backhaul data rate based on the radio band.

14. The wireless communication network of claim 11 wherein the wireless network core is configured to select a downlink Ambient Bit Rate (AMBR) based on the radio band to select the backhaul data rate based on the radio band.

15. The wireless communication network of claim 11 wherein the wireless network core comprises a Session Management Function (SMF) configured to select the backhaul data rate based on the radio band.

16. The wireless communication network of claim 11 wherein the wireless network core comprises a Policy Control Function (PCF) configured to select the backhaul data rate based on the radio band.

17. The wireless communication network of claim 11 wherein the wireless network core comprises an Access and Mobility Management Function (AMF) configured to select the backhaul data rate based on the radio band.

18. The wireless communication network of claim 11 wherein the user plane in the wireless network core comprises a User Plane Function (UPF) configured to exchange the user data with the wireless access node over the backhaul data link using the selected backhaul data rate.

19. The wireless communication network of claim 11 wherein the wireless access node comprises a Fifth Generation New Radio (5GNR) access node.

20. The wireless communication network of claim 11 wherein the radio band comprises a block of Federal Communication Commission (FCC) licensed radio spectrum.

* * * * *